Patented July 28, 1936

2,048,821

UNITED STATES PATENT OFFICE 2,048,821

MANUFACTURE OF SUBSTITUTED ACID AMIDES

Wilhelm Schneider, Dessau in Anhalt, Germany, assignor to I. G. Farbenindustrie Aktiengesellschaft, Frankfort-on-the-Main, Germany No Drawing. Application June 5, 1934, Serial No. 729,155. In Germany June 13, 1933

6 Claims. (Cl. 260—124).

My present invention relates to the manufacture of substituted acid amides.

One of its objects is a process of producing substituted acid amides. Further objects will be seen from the detailed specification following hereafter.

I have found that substituted acid amides may be obtained by treating an oxazole base of the following general formula $$\underset{R_2}{\overset{R_1}{\underset{|}{\bigg\langle}}}\overset{O}{\underset{N}{\overset{3}{\underset{1}{\bigg\rangle}}}}\overset{}{\underset{X}{\overset{2}{C-R_3}}}$$

with a strong alkali. In formula 1
X = halide, sulfalkylate or another acid radical,
$R_1$ = phenylene, naphthylene, or another ring system,
$R_2$ = alkyl,
$R_3$ = alkyl, aralkyl, aryl or a substituted aryl-group; also a hydroaromatic or a heterocyclic group.

As strong alkalies there are used, for example, sodium hydroxide, potassium hydroxide, sodium ethylate, potassium ethylate or strong organic bases, such as piperidine, or quaternary organic ammonium bases. In the case of using sodium hydroxide and the like bases, the substituted acid amide is directly obtained; when using sodium ethylate the acid amide is obtained in form of an acetal which is converted into the acid amide by treatment with an acid.

The substituted heterocyclic bases used as parent materials are obtained by condensing an ortho-aminophenol with any carboxylic acid according to the following scheme:

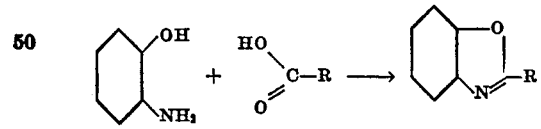

In this manner there are obtained oxazole bases which contain a substituent in 2-position to the nitrogen.

The oxazole bases are probably split according to the following scheme:

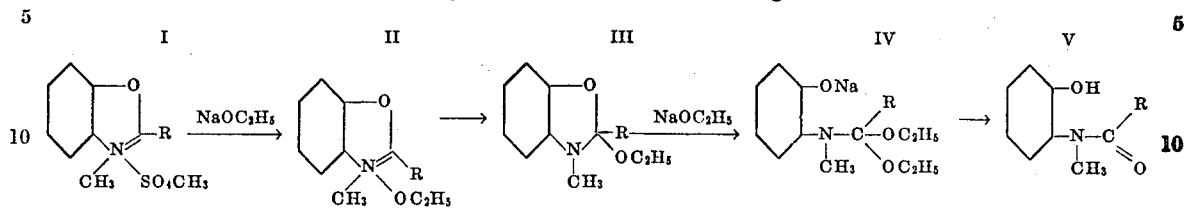

The oxazole bases are converted into quaternary ammonium salts (I) by the action of dialkyl-sulfate or alkyl halides. By the action of strong alkalies, for example, sodium alcoholate, there is obtained first of all the ether of the base (II) and therefrom the pseudo-base (III). From the pseudo-base there is obtained by further action of sodium alcoholate the substituted acid amide (IV) in the form of an acetal, which, by the action of acid, is converted into the corresponding substituted acid amide (V).

The following examples illustrate the invention:

Example 1.—15 grams of 2-ethylbenzoxazole ($\frac{1}{10}$ mol.) 12 cc. of dimethyl sulfate ($\frac{1}{10}$ mol.) are heated together on the water bath until the reaction begins. When the reaction is finished, the whole is allowed to cool, whereby the 2-ethyl-benzoxazole-dimethyl sulfate thus formed solidifies in a crystalline form.

2.7 grams of 2-ethylbenzoxazole-dimethyl sulfate ($\frac{1}{100}$ mol.) are dissolved in a small quantity of absolute alcohol, and to the solution there are added 8 cc. of sodium ethylate solution (1 mol. proportion of sodium to 400 cc. of alcohol), which equals 2/100 mol., and the whole is heated for a short time on the water bath. The solution contains the acid amide in the form of an acetal, probably of the following formula

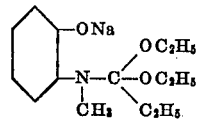

The acid amide itself is precipitated by neutralization of the solution with dilute mineral acid and by addition of water.

Example 2.—16 grams of 2-propylbenzoxazole are heated on the water-bath with 12 cc. of dimethyl sulfate. The 2-propylbenzoxazole-dimethyl sulfate is split, as in Example 1, by heating with sodium ethylate, to form the corresponding substituted butyric acid amide in the form of an acetal, and the substituted butyric acid amide itself is precipitated as in Example 1.

Example 3.—109 grams of ortho-aminophenol, and 256 grams of palmitic acid are heated to 200° C., until 2 mol. proportions of water (36 cc.) have been distilled. The 2-heptadecylbenzoxazole thus formed is distilled in vacuo. The 2-heptadecylbenzoxazoledimethyl sulfate obtained by reaction with dimethyl sulfate is heated with sodium ethylate solution. The acetal of the substituted palmitic acid amide is converted by acid into the corresponding substituted palmitic acid amide, and this is precipitated as in Example 1.

Example 4.—128 grams of cyclohexylcarboxylic acid and 109 grams of ortho-aminophenol are heated together to 150 to 200° C., until two molecular proportions of water have been distilled, and then heated to a higher temperature until the 2-cyclohexylbenzoxazole has been distilled. This is converted into an acetal of the substituted amide of cyclo-hexylcarboxylic acid by treatment with sodium ethylate, and the corresponding substituted cyclohexylcarboxylic acid amide is obtained as in Example 1.

Example 5.—109 grams of ortho-aminophenol and 112 grams of pyromucic acid are heated together to 150–200° C., until 36 cc. of water have been distilled. Then, by heating to a higher temperature the furylbenzoxazole formed is distilled. The acetal of the corresponding substituted amide of furane-carboxylic acid is obtained by treatment with sodium ethylate, and the substituted furane-carboxylic acid amide itself is precipitated as in Example 1.

Example 6.—3 grams of ethylbenzoxazolemethyl-perchlorate are split to the acetal of the corresponding propionamide with 8 cc. of a solution of sodium ethylate in the manner described in Example 1. After the addition of acid and dilution with water the same product is obtained as it is described in Example 1. It has the melting point 151° C. and forms white needles.

Example 7.—2.7 grams of ethylbenzoxazole dimethylsulfate are heated with 10 cc. of a 2n solution of sodium hydroxide or potassium hydroxide, then there are added 5 cc. of a 2n solution of hydrochloric acid, and the mixture is diluted with water. As in Example 1, a substituted propionamide is obtained.

Example 8.—3.1 grams of 2-methyl-$\beta$-$\beta'$-naphthoxazole dimethylsulfate are dissolved in a few cc. of absolute alcohol. The solution is mixed with 8 cc. of a solution of sodium ethylate (1 atomic proportion of sodium on 400 cc. of alcohol), and warmed for a short period on the water bath. From the solution which is obtained, the substituted acetamide is precipitated by the addition of diluted hydrochloric acid and dilution with water. It has the melting point 186° C.

The substituted acid amides obtained by splitting oxazoles can be converted into N-substituted aminophenols or aminonaphthals by saponifying them with a strong mineral acid.

What I claim is:

1. The process of producing a substituted acid amide which comprises treating a quaternary ammonium salt of an oxazole substituted in $\alpha$-position to the nitrogen atom by a radical selected from the group consisting of alkyl, aralkyl, aryl, a hydroaromatic group, and a heterocyclic group, with a strong alkali.

2. The process of producing a substituted acid amide which comprises treating a quaternary ammonium salt of an oxazole substituted in $\alpha$-position to the nitrogen atom by a radical selected from the group consisting of alkyl, aralkyl, aryl, a hydroaromatic group, and a heterocyclic group with a solution of caustic soda.

3. The process of producing a substituted acid amide which comprises treating a quaternary ammonium salt of an oxazole substituted in $\alpha$-position to the nitrogen atom by a radical selected from the group consisting of alkyl, aralkyl, aryl, a hydroaromatic group, and a heterocyclic group with a solution of sodium ethylate, and converting the acetal obtained into the acid amide by treatment with an acid.

4. The process which comprises heating 2-ethylbenzoxazole dimethylsulfate with a solution of caustic soda, and neutralizing the reaction mixture with hydrochloric acid.

5. The process which comprises dissolving 2-cyclohexylbenzoxazole in alcohol, heating this solution with sodium ethylate on the water bath, and converting the acetal obtained into the acid amide by means of hydrochloric acid.

6. The process which comprises dissolving 2-methyl-$\beta$-$\beta'$-naphthoxazole dimethylsulfate in alcohol, heating this solution with sodium-ethylate on the water bath, and converting the acetal obtained into the acid amide by means of hydrochloric acid.

WILHELM SCHNEIDER.